(12) United States Patent
Nuzzi et al.

(10) Patent No.: US 8,597,126 B2
(45) Date of Patent: Dec. 3, 2013

(54) DONATION INCENTIVATION SYSTEM

(75) Inventors: Frank Anthony Nuzzi, Pflugerville, TX (US); James Brett Sowder, Austin, TX (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/433,631

(22) Filed: Mar. 29, 2012

(65) Prior Publication Data

US 2013/0260890 A1 Oct. 3, 2013

(51) Int. Cl.
*A63F 13/10* (2006.01)
*A63F 13/12* (2006.01)

(52) U.S. Cl.
USPC ............... 463/42; 463/25; 463/40; 463/41

(58) Field of Classification Search
USPC ........................................ 463/25, 40–42
See application file for complete search history.

(56) References Cited

U.S. PATENT DOCUMENTS

| | | | | |
|---|---|---|---|---|
| 8,282,491 B2 * | 10/2012 | Auterio et al. | ............ | 463/42 |
| 8,287,383 B1 * | 10/2012 | Etter et al. | ............ | 463/42 |
| 8,287,384 B2 * | 10/2012 | Auterio et al. | ............ | 463/42 |
| 8,292,743 B1 * | 10/2012 | Etter et al. | ............ | 463/42 |
| 8,388,451 B2 * | 3/2013 | Auterio et al. | ............ | 463/42 |
| 8,388,452 B2 * | 3/2013 | Auterio et al. | ............ | 463/42 |
| 8,444,491 B2 * | 5/2013 | Bethke et al. | ............ | 463/42 |
| 8,454,441 B2 * | 6/2013 | Auterio et al. | ............ | 463/42 |
| 2011/0071895 A1 * | 3/2011 | Masri | ............ | 705/14.27 |
| 2011/0223895 A1 * | 9/2011 | Wagda et al. | ............ | 455/414.2 |
| 2012/0040743 A1 * | 2/2012 | Auterio et al. | ............ | 463/25 |
| 2012/0040745 A1 * | 2/2012 | Auterio et al. | ............ | 463/25 |
| 2012/0040746 A1 * | 2/2012 | Auterio et al. | ............ | 463/25 |
| 2012/0040747 A1 * | 2/2012 | Auterio et al. | ............ | 463/25 |
| 2012/0040760 A1 * | 2/2012 | Auterio et al. | ............ | 463/40 |
| 2012/0040761 A1 * | 2/2012 | Auterio et al. | ............ | 463/42 |
| 2012/0040763 A1 * | 2/2012 | Auterio et al. | ............ | 463/42 |
| 2012/0054113 A1 * | 3/2012 | Jayaraman et al. | ............ | 705/306 |
| 2013/0005437 A1 * | 1/2013 | Bethke et al. | ............ | 463/25 |
| 2013/0005466 A1 * | 1/2013 | Mahajan et al. | ............ | 463/36 |
| 2013/0005473 A1 * | 1/2013 | Bethke et al. | ............ | 463/42 |
| 2013/0005474 A1 * | 1/2013 | Bethke et al. | ............ | 463/42 |
| 2013/0005475 A1 * | 1/2013 | Mahajan et al. | ............ | 463/42 |
| 2013/0005480 A1 * | 1/2013 | Bethke et al. | ............ | 463/42 |
| 2013/0072308 A1 * | 3/2013 | Peck et al. | ............ | 463/42 |
| 2013/0159086 A1 * | 6/2013 | Richard | ............ | 705/14.33 |

* cited by examiner

*Primary Examiner* — Arthur O. Hall
*Assistant Examiner* — Bach Hoang
(74) *Attorney, Agent, or Firm* — Haynes and Boone, LLP (57) ABSTRACT

A method for incentivizing donations using virtual currencies includes determining that a user associated with a game and determining a location of the user. A charity provider is then identified that is both associated with the game and within a predetermined distance of the location. A donation incentivization message is then sent to the user that includes an identification of the charity provider. A plurality of redemption codes are also sent to the charity provider. A first redemption code of the plurality of redemption codes that is associated with the user and a donation from the user to the charity provider is received. The first redemption code is then used to credit a user account that is associated with the user with a virtual currency amount that is determined using the donation.

18 Claims, 11 Drawing Sheets

DONATION INCENTIVATION SYSTEM

BACKGROUND

1. Field of the Invention

The present invention generally relates to online and/or virtual currencies and more particularly to a donation incentivization system using online and/or virtual currencies.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Online gaming has contributed to the rise of online and/or virtual currencies (hereinafter "virtual currencies") that can be purchased from the game provider and, in some instances, with the help of a payment service provider. These virtual currencies may be purchased with "real world" currencies (e.g., United States Dollars) and then used to purchase items in the game. In many situations, the virtual currencies are the only means with which a user may purchase items in the game, and thus the acquisition of the virtual currency is necessary in order to play the game. Conventionally, users must either perform certain actions within the game in order to obtain the virtual currency, or pay real world currencies to the game provider in order to have the virtual currencies added to their game account. Such conventional virtual currency acquisition options are limiting.

Thus, there is a need for an improved virtual currency acquisition system.

SUMMARY

According to one embodiment, a method for incentivizing donations using virtual currencies includes determining that a user that is associated with a game is in a particular location, and then determining that a charity provider is within a predetermined distance of that location. A donation incentivization message is then sent to the user that identifies the charity provider and instructs the user to donate to the charity provider such that the user may be credited with virtual currency that is used in the game.

In an embodiment, the method includes providing the charity provider with a plurality of redemption codes. In response to the user making a donation to the charity provider, the charity provider may provide the user with one of the redemption codes. The user may then submit the redemption code in the game in order to be credited with a virtual currency amount that may be determined based on the value of the donation. The method may also include suggesting donations for the user based on a review of user purchases that are over a predetermined age.

As a result, a user may acquire virtual currency in a game by donating items to a local charity. The acquisition of the virtual currency may incentivize the user to make donations that they otherwise would not make, and items suitable for donation to the local charity may be suggested to the user by reviewing previous purchases of the user to provide the user with specific items for donation to further incentivize those donations.

These and other features and advantages of the present disclosure will be more readily apparent from the detailed description of the embodiments set forth below taken in conjunction with the accompanying figures.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for incentivizing donations using virtual currencies. A location of a user that is associated with a game is determined, and at least one charity provider is determined to be both associated with the game and within a predetermined distance of the location. A donation incentivization message is then sent to the user (e.g., within the game) that identifies the charity provider and suggests that the user donate to the charity provider to receive virtual currency for the game. In response to the user donating to the charity provider, the charity provider may provide the user with a redemption code. The user may then provide the redemption code in order to be credited with a virtual currency amount that may be based on the value of the donation. The system and method incentivize a user to donate to local charities by providing virtual currency to the user for a game they are associated with and, in some embodiments, suggesting previous purchases of the user for donation.

Figure 1:
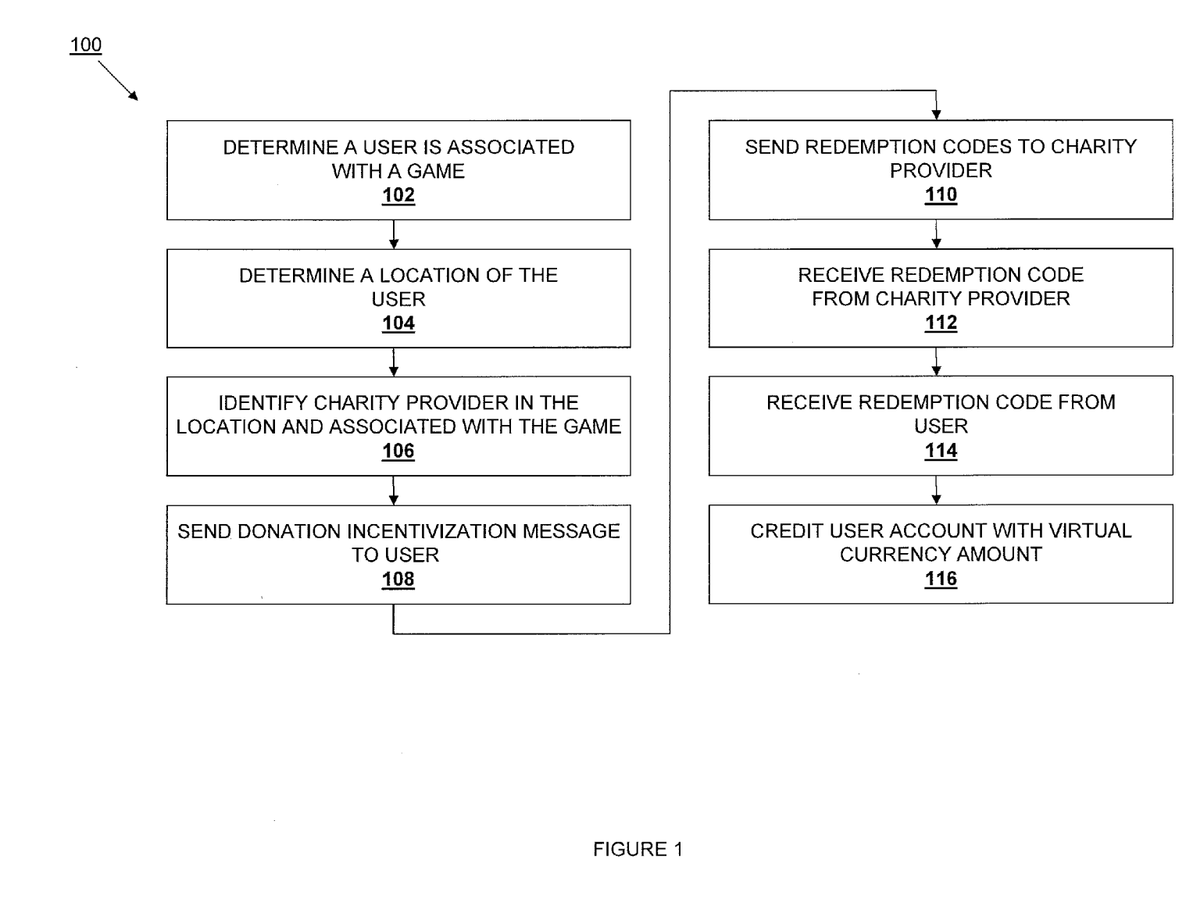
FIG. 1 is a flow chart illustrating an embodiment of a method for incentivizing donations using virtual currencies.
Figure 2:
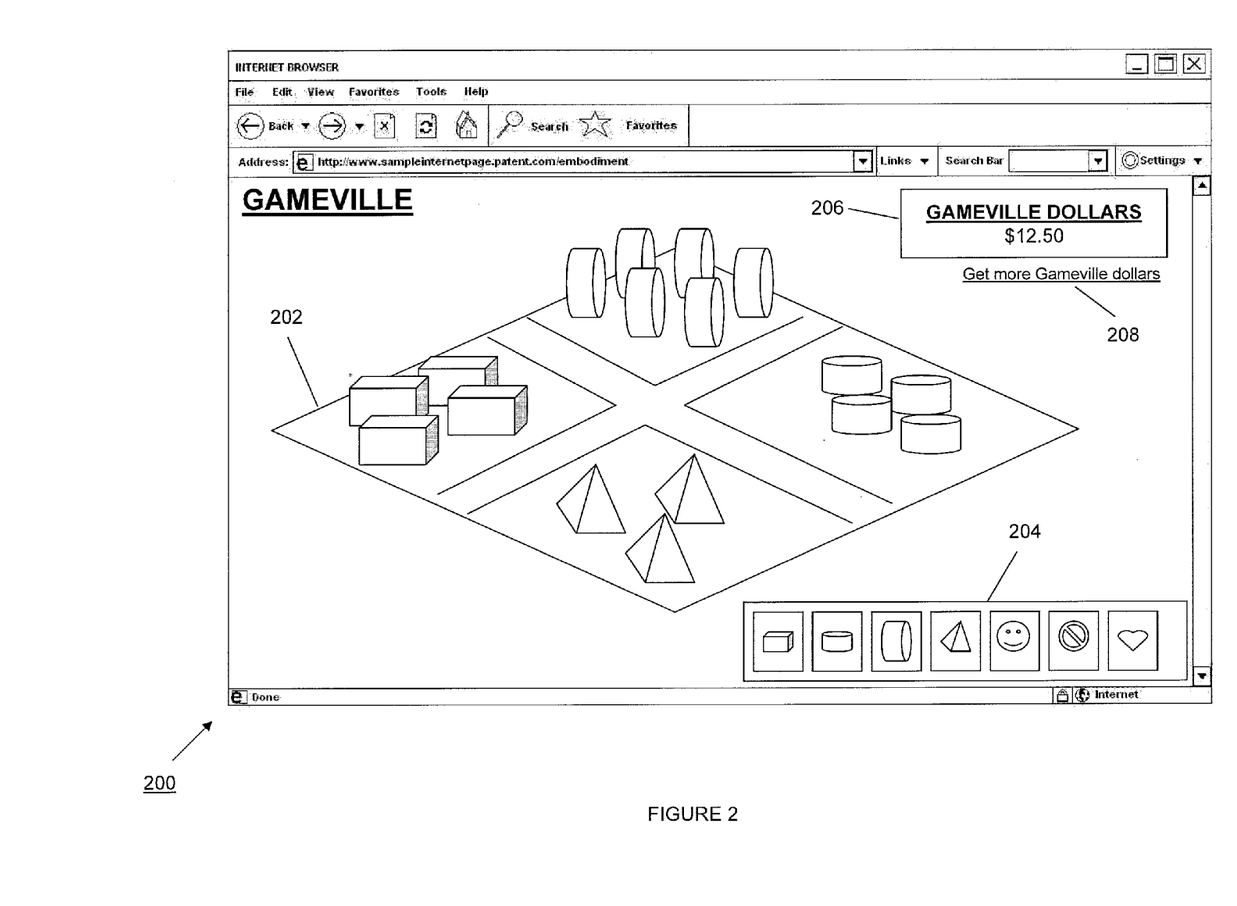
FIG. 2 is a screenshot view illustrating an embodiment of a game screen.

Referring now to FIGS. 1 and 2, a method 100 for incentivizing donations using virtual currencies is illustrated. In the embodiment of the method 100 described below, a game provider provides a user with a user game account associated with a game provided by the game provider, and the user may earn or buy virtual currency that is then stored and/or associated with the game account to, for example, make virtual or other purchases in the game. In some embodiments, an account provider provides the user with a user financial account that the user may use to make purchases from a variety of merchants and/or to purchase virtual currency in the game. In some embodiments, a payment service provider such as, for example, PayPal, Inc. of San Jose, Calif., assists in the making of payments from the user to merchants (e.g., the game provider or other merchants) by transferring funds from the user financial account to a merchant account of the merchant. In the embodiments discussed below, a donation incentivization system provider operates a donation incentivization system provider device to provide the donation incentivization system. The donation incentivization system provider may include the game provider, the account provider, the payment service provider, a third party provider, and/or combinations thereof. Thus, the interactions discussed below between the donation incentivization system provider and any of the game provider, the account provider, and the payment service provider may include internal interactions (e.g., when the game provider is the donation incentivization system provider and the donation incentivization system provider is discussed as interacting with the game provider). However, these embodiments are meant to be merely exemplary, and one of skill in the art will recognize that a variety of modifications may be made to the payment system discussed below without departing from the scope of the present disclosure.

The method 100 begins at block 102 where it is determined that a user is associated with a game. As discussed above, the game provider provides a game that the user is associated with. FIG. 2 illustrates an embodiment of a game screen 200 for a game that is provided by a game provider device of the game provider to a user device of the user over a network. While one of skill in the art will recognize the game discussed below as an "online" game provided through an Internet browser over the network, the teachings of the present disclosure are envisioned as applying to a wide variety of games including those associated with game applications stored on and run by a user device, those provided on a removable, computer-readable medium that may be coupled to and run by the user device, and/or a variety of other games known in the art. As also described above, the game provider may provide the user with a user game account that associates the user and/or the user device with the game. The game screen 200 includes game play features 202 and 204, along with a user game account virtual currency indicator 206 and a virtual currency acquisition link 208. In the illustrated embodiment, the user game account virtual currency indicator 206 includes an amount (e.g., "$12.50") of virtual currency that the user has acquired through, for example, game play, purchases with a real world currency (e.g., US Dollars), and/or previous performance of the method 100. At block 102 of the method 100, the determination that the user is associated with the game may be accomplished in response to the user being provided a user game account by the game provider or has a user game account.

The method 100 then proceeds to block 104 where a location of the user is determined. In an embodiment, the method 100 may proceed to block 104 in response to the user selecting the virtual currency acquisition link 208. In other embodiments, the method 100 may be initiated by the donation incentivization system provider. The donation incentivization system provider device may determine the location of the user that is associated with the game in a variety of ways. In an embodiment, the user device may include a location determination device that is operable to determine the physical location of the user device, and at block 104, the donation incentivization system provider device may instruct the user device to use the location determination device to determine physical location data for the user device and provide that physical location data to the donation incentivization system provider device over the network.

In another embodiment, the user may have previously provided their location such that it is accessible by the donation incentivization system provider device over the network. For example, the user may have provided their location to the game provider as part of the user game account stored on the game provider device. In another example, the user may have provided their location to the account provider as part of the user financial account stored on the account provider device. In another example, the user may have provided their location to the payment service provider as part of a user payment service account stored on the payment service provider device. In another example, the user may have provided their location to the donation incentivization system provider device. At block 104 of the method 100, the donation incentivization system provider device may access the storage location of the previously provided location of the user to determine the location of the user.

In yet another embodiment, the donation incentivization system provider device may be operable to determine the location of the user based on other user information. In such embodiments, the account provider and/or the payment service provider may have access to a plurality of purchases made by the user, and those purchases may be reviewed by the donation incentivization system provider device to determine the user location. For example, a plurality of recent purchases made in the same area may indicate to the donation incentivization system provider device that the location of the user is in that area. In another example, a purchase or other communication that indicates that the user will be traveling over a period of time (e.g., a plane ticket, a hotel bill or reservation, etc.) may indicate to the donation incentivization system provider device that the location of the user is at the travel destination if the method 100 is performed during the travel dates.

In some embodiments, the determination of the location of the user at block 104 of the method 100 may be omitted. For example, in some embodiments, the user may wish to donate to a charity provider online or over the network from the user device to a charity provider device rather than provide physical items to a local charity (discussed in further detail below). In such embodiments, the location of the user device, which may be used to determine a local charity to which the user may donate, is not needed and block 104 of the method 100 is skipped.

The method 100 then proceeds to block 106 where a charity provider that is near the location of the user and that is associated with the game is identified. In an embodiment, the donation incentivization system provider device uses the game that the user was determined to be associated with in block 102 of the method 100, along with the location of the user determined in block 104 of the method 100, to identify a charity provider. In some embodiments, the charity provider may be associated with the game simply by agreeing to provide redemption codes, discussed in detail below, to users in response to donations from the user. Thus, while in some embodiments the charity provider identified in block 106 may be associated with a specific game (e.g., when the game provider is the donation incentivization system provider and the charity provider receives and distributes redemption codes provided for a specific game or games by the game provider), in other embodiments the charity provider will be determined to be associated with a game simply be agreeing to participate in the donation incentivization system for any game in which the donation incentivization system is implemented.

Using methods known in the art, the donation incentivization system provider device determines one or more charity providers that are associated with the game that the user is associated with, discussed above, and that are within a predetermined distance of the location of the user. For example, the donation incentivization system provider device may use conventional mapping techniques to determine one or more of the charity providers that are associated with the game and that are within 2 miles of the location of the user determined in block 104 of the method 100. In some embodiments, the user may use the user device to set the predetermined distance from the location of the user for which charity providers will be identified in block 106. As discussed above, in some embodiments, the user may donate to the charity provide online or over the network from the user device to the charity device. In such embodiments, block 106 of the method 100 simply involve determining that the charity provider is associated with the game, and the determination that the charity provider is within a predetermined distance of the user is not performed.

Figure 3:
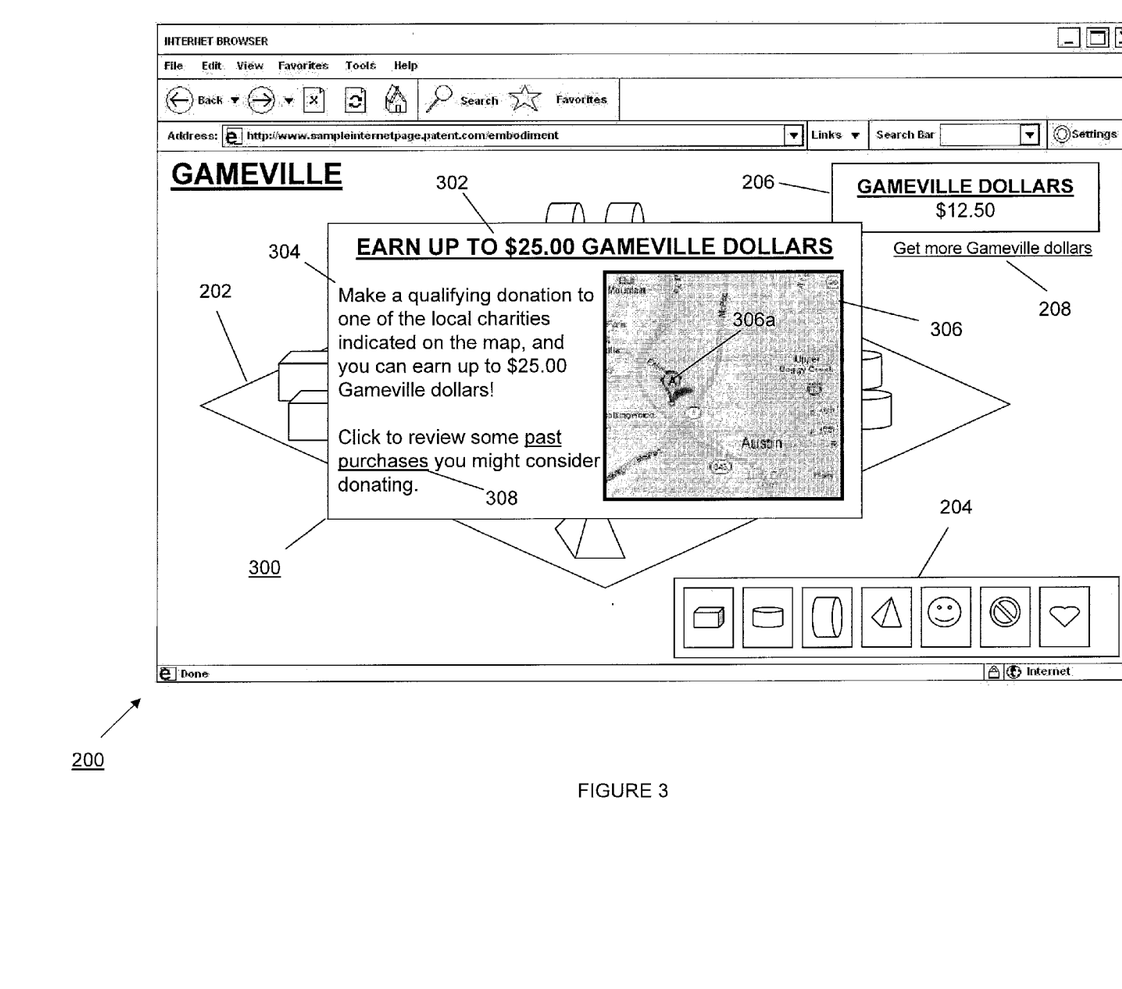
FIG. 3 is a screenshot view illustrating an embodiment of a donation incentivization message provided on the game screen of FIG. 2.

Referring now to FIGS. 1 and 3, the method 100 then proceeds to block 108 where a donation incentivization message is sent to the user. In an embodiment, the donation incentivization system provider device sends a donation incentivization message to the user device over the network. FIG. 3 illustrates an embodiment of a donation incentivization message 300 that has been provided on the game screen 200 described above with reference to FIG. 2. In the illustrated embodiment, the donation incentivization message 300 includes a virtual currency acquisition announcement 302 (e.g., "EARN UP TO $25.00 GAMEVILLE DOLLARS"), a virtual currency acquisition description 304 explaining that the user may earn virtual currency by donating to a local charity that is indicated on a map 306 that includes at least one charity provider indicator 306a for each charity provider determined in block 106 of the method 100, and a donation suggestion link 308, discussed in further detail below. While the donation incentivization message 300 is illustrated and described as being provided overlaying the game screen 200, one of skill in the art will recognize that the donation incentivization message may be provided on a separate screen, by redirecting the user to a different web page, through an email, text message, or other communication, and/or in a variety of other manners while remaining within the scope of the present disclosure.

Figure 4:
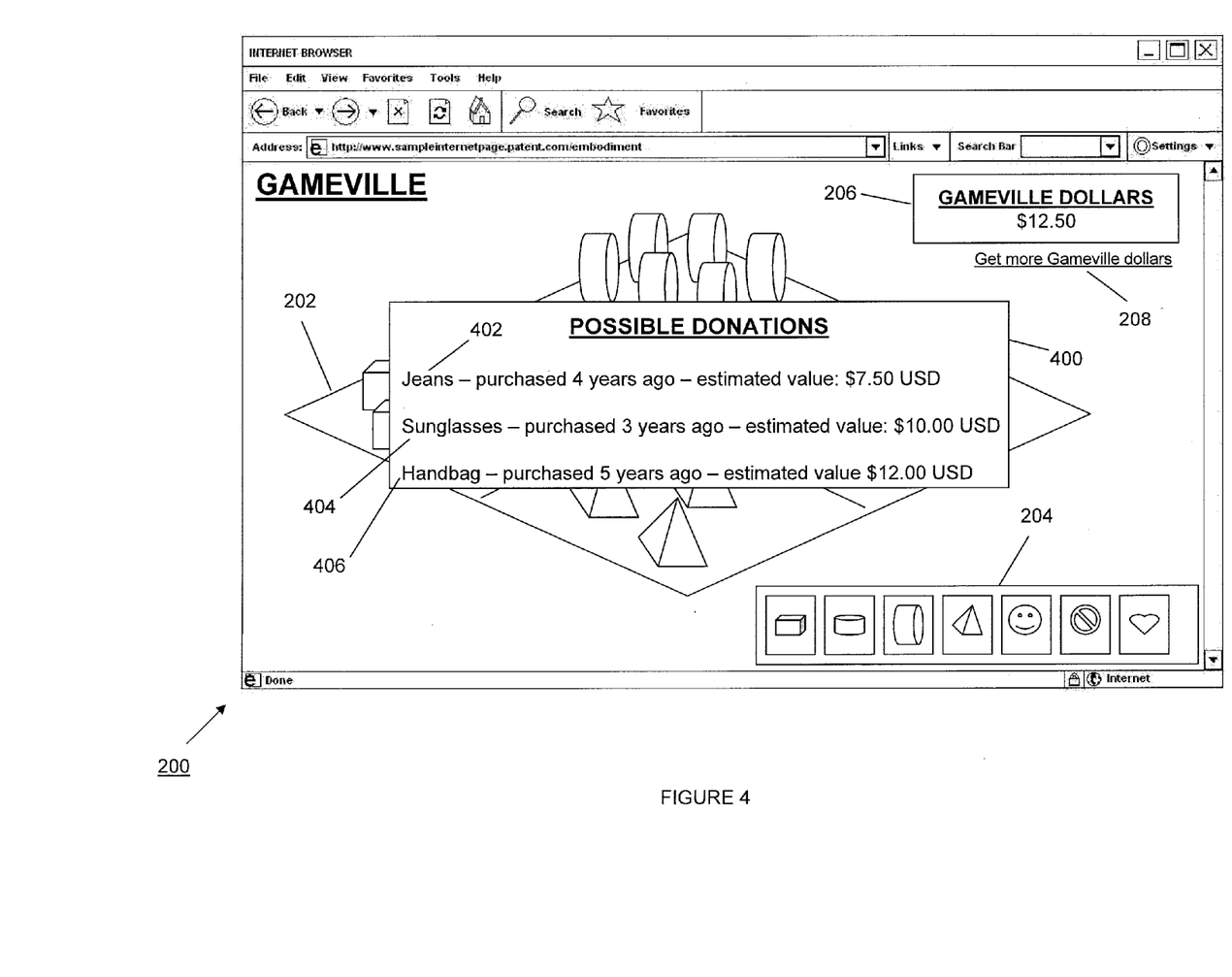
FIG. 4 is a screenshot view illustrating an embodiment of a donation suggestion message provided on the game screen of FIG. 2.

Referring now to FIGS. 1 and 4, in an embodiment, the user may select the donation suggestion link 308 in the donation incentivization message 300, and the donation incentivization system provider device will provide a donation suggestion message to the user device over the network. In an embodiment, in response to the user selecting the donation suggestion link 308, the donation incentivization system provider device may access a purchase history of the user in order to determine one or more previous purchases of the user that the user may wish to donate. For example, the account provider device and/or the payment service provider device may include a purchase history for the user that includes a plurality of previous purchases made by the user, and the donation incentivization system provider device may access the purchase history and determine whether any of the previous purchases in the purchase history qualify as a suggested donation. Previous purchases may qualify as a suggested donation is they are associated with a purchase date that exceeds a predetermined age (e.g., purchases that are at least 3 years old), if they are associated with a certain class of product (e.g., clothing, wearable accessories, furniture, appliances, etc.), and/or a variety of other donation criteria known in the art.

In response to determining that one or more previous purchases qualify as suggested donations, the donation incentivization system provider device may estimate a value for each of those suggested donations. In an embodiment, the donation incentivization system provider device may estimate the value of suggested donations by accessing a database that includes estimate product values, use an estimation algorithm that may consider the age, wear, and/or other characteristics of the suggested donation to estimate its value, and/or use a variety of other techniques known in the art to estimate a value previous purchases. The user may be asked, or may voluntarily provide, information about the current condition of previous purchases (e.g., condition, operability, etc.) in order to facilitate the estimation of the value of those previous purchases.

FIG. 4 illustrates an embodiment of a donation suggestion message 400 that has been provided on the game screen 200, described above with reference to FIG. 2, in response to the user selecting the donation suggestion link 308. In the illustrated embodiment, the donation suggestion message 400 includes a plurality of suggested donations 402, 404, and 406. As can be seen, the suggested donation 402 includes a suggested donation type ("Jeans"), a suggested donation age ("purchased 4 years ago"), and an estimated value ("$7.50 USD"), the suggested donation 404 includes a suggested donation type ("Sunglasses"), a suggested donation age ("purchased 3 years ago"), and an estimated value ("$10.00 USD"), and the suggested donation 406 includes a suggested donation type ("Handbag"), a suggested donation age ("purchased 5 years ago"), and an estimated value ("$12.00 USD"). While a few examples of suggested donations have been described, one of skill in the art will recognize that a variety of suggested donations will fall within the scope of the present disclosure. In an embodiment, the donation incentivization system provider may solicit the merchant of a pervious purchase for coupons or other discounts and provide those along with the suggested donation in order to further incentivize the donation. The user may then activate the coupon by donating that previous purchase such that the user may use the coupon to make a new purchase from the merchant.

Figure 5:
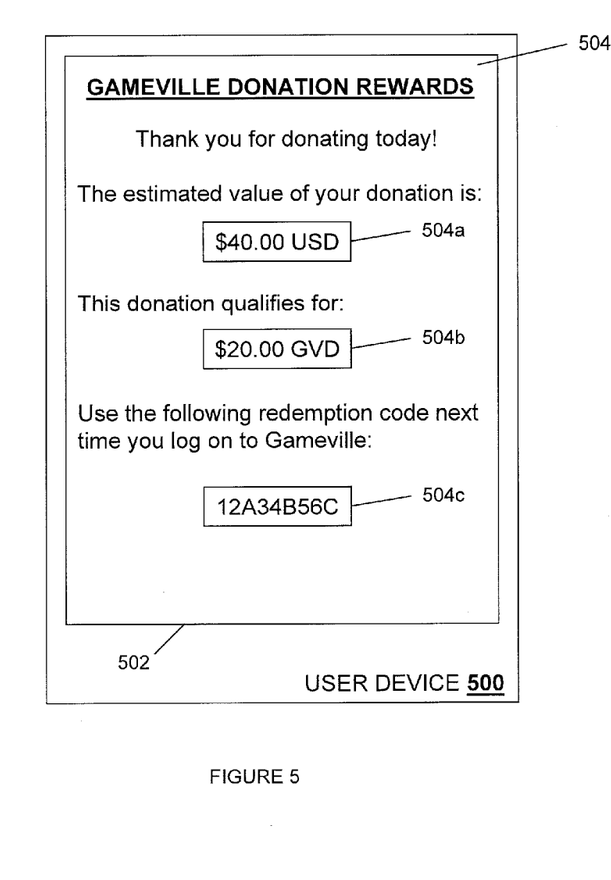
FIG. 5 is a front view of a user device displaying a donation confirmation screen.

Referring now to FIGS. 1 and 5, the method 100 then proceeds to block 110 where at least one redemption code is sent to a charity provider. In an embodiment, the donation incentivization system provider device sends at least one redemption code to a charity provider (e.g., over the network to a charity provider device of the charity provider.) For example, the donation incentivization system provider device may send a plurality of redemption codes to each charity provider that has agreed to participate in the donation incentivization system. In this example, the sending of the plurality of redemption codes to the charity providers may be the first step performed in the method 100 and, as discussed above, each of the charity providers receiving redemption codes may be associated with any game for which those redemption codes may be redeemed. In another example, the donation incentivization system provider device may provide a redemption code to a charity provider upon a request from the charity provider (e.g., after the charity provider has received a donation from a user.)

A user may then respond to the donation incentivization message sent in block 108 by providing a donation (including one or more items) to one of the charity providers identified in block 106 and, in response, the charity provider may provide the user with a redemption code. In some embodiments, the charity provider includes a charity provider device in which the charity provider may associate a redemption code provided to a user in response to a donation with one or more details associated with the donation. Details associated with the donation may include an estimated value of the donation, item descriptions of items associated with the donation, conditions of items associated with the donation, and/or a variety of other donation details known in the art.

FIG. 5 illustrates a user device 500 having a display 502 displaying a donation confirmation screen 504. The donation confirmation screen 504 includes a donation estimated value 504a, a virtual currency amount 504b, and a redemption code 504c. In the illustrated embodiment, the charity provider receives the donation from the user, selects (or requests and receives) the redemption code 504c, associates at least one donation detail with the redemption code in the charity provider device, and uses the charity provider device to provide the donation confirmation screen 504 to the user device over the network. In some embodiments, the charity provider device may use the donation details associated with the redemption code 504c to determine the virtual currency amount 504b. For example, the charity provider may use the donation estimated value 504a of the item(s) in the donation to determine the virtual currency amount 504b. In another example, the charity provider may use the items descriptions, conditions, age, and/or other donation value details to determine the virtual currency amount 504b. While the donation confirmation is illustrated and described as being provided electronically from a charity provider device to a user device as the donation confirmation screen 504, a paper or otherwise hard copy of the donation confirmation screen may be provided to a user that includes similar information as the donation confirmation screen 504 while remaining within the scope of the present disclosure. Furthermore, the user may only be provided with the redemption code (e.g., without any details associated with the donation.)

The method 100 then proceeds to block 112 where a redemption code is received from the charity provider. In an embodiment, upon receiving a donation from a user, associating a redemption code with at least one donation detail, and providing the redemption code to the user, the redemption code and the at least one donation detail may be sent from the charity provider device to the donation incentivization system provider device over the network. In other embodiments, the redemption code may be sent by itself (e.g., without the at least one donation detail associated with it in the charity provider device) from the charity provider device to the donation incentivization system provider device over the network. In some embodiments, the charity provider may not send the redemption code that was provided to the user to the donation incentivization system provider (e.g., when the user provides the redemption code to the donation incentivization system provider), and block 112 may be skipped.

Figure 6:
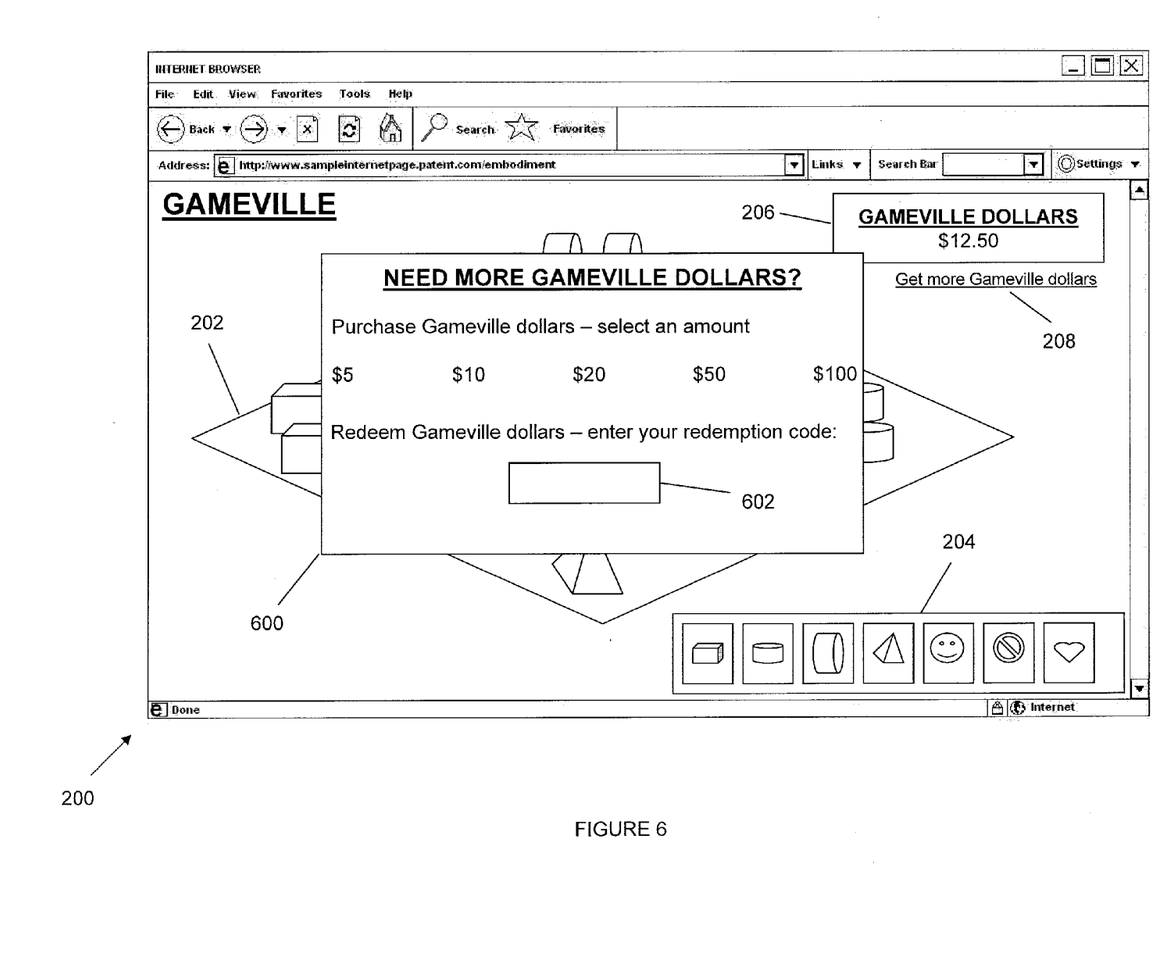
FIG. 6 is a screenshot view illustrating an embodiment of a redemption message provided on the game screen of FIG. 2.

Referring now to FIGS. 1 and 6, the method 100 then proceeds to block 114 where the redemption code is received from the user. In an embodiment, upon receiving the redemption code from the charity provider subsequent to providing the donation, the user may provide the redemption code to the donation incentivization system provider. FIG. 6 illustrates a redemption message 600 that has been provided on the game screen 200, described above with reference to FIG. 2. In an embodiment, the redemption message 600 is provided in response to the user selecting the virtual currency acquisition link 208. The redemption message 600 includes a redemption code input 602. At block 114 of the method 100, the user may provide the redemption code received from the charity provider in the redemption code input 602 in order to provide the redemption code from the user device to the donation incentivization system provider device over the network. In some embodiments, the user may not provide the redemption to the donation incentivization system provider (e.g., when the charity provider provides the redemption code to the donation incentivization system provider), and block 114 may be skipped.

Figure 7:
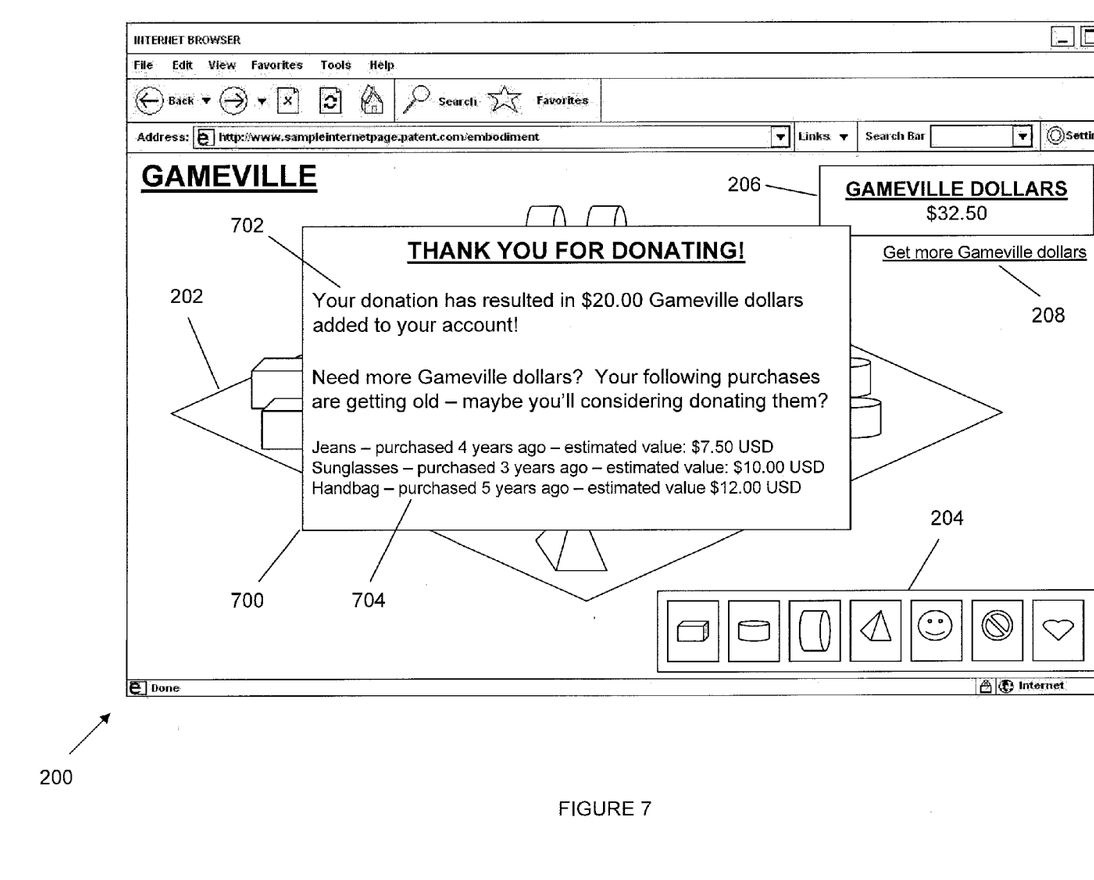
FIG. 7 is a screenshot view illustrating an embodiment of a redemption confirmation message provided on the game screen of FIG. 2

Referring now to FIGS. 1 and 7, the method 100 then proceeds to block 116 where the user game account of the user is credited with a virtual currency amount. In an embodiment, upon receiving the redemption code from the user in block 114 of the method 100, the donation incentivization system provider device uses the redemption code to access at least one detail associated with the donation in order to determine a virtual currency amount to credit to a user game account associated with the user. For example, if the redemption code received from the charity provider in block 112 of the method 100 included at least one donation detail, that donation detail may be used to determine the virtual currency amount to credit to the user game account (e.g., a donation estimated value provided with the redemption code from the charity provider may be used to determine the virtual currency amount to credit to the user game account.) In another example, if the redemption code was received by itself from the charity provider in block 112 of the method 100, the donation detail associated with that redemption code in the charity provider device may be retrieved by the donation incentivization system provider device over the network (e.g., item descriptions, age, and conditions associated with the redemption code in the charity provider device may be used to determine the virtual currency amount to credit to the user game account). In another embodiment, when a previous purchase has been donated by a user, the donation incentivization system provider may use details about that previous purchase in a purchase history of the user (e.g., a purchase type, a purchase age, etc.) to estimate the value of the donation and use that estimation to determine an amount of virtual currency to credit to the user. While a few examples of the determination of the virtual currency amount that will be credited to the user game account have been provided, one of skill in the art will recognize that a variety of techniques may be used to determine the amount of virtual currency to credit to a user in response to a user donation.

FIG. 7 illustrates a redemption confirmation message 700 that has been provided on the game screen 200, described above with reference to FIG. 2, by the donation incentivization system provider device to the user device over the network. The redemption confirmation message 700 includes a confirmation 702 of the amount of virtual currency that was credited to the user game account (along with an updated virtual currency indicator 206 that includes the credited virtual currency amount) and a suggested donations section 704 that includes a plurality of previous purchases that user may wish to donate (which may be determined and provided substantially as described above). In some embodiments, virtual currency obtained by the user through the method 100 may allow access to purchase items within the game using that virtual currency that the user would otherwise not have access to (e.g., some items may only be allowed to be purchased with virtual currency obtained through donations.) In some embodiments, the user may select a game to which they would like the virtual currency to be applied. For example, the user may make a donation and then later have that donation used for a virtual currency credit to a game of their choice.

Thus, a system and method for incentivizing donations using virtual currencies is provided that using the prospect of gaining virtual currency in a game to incentivize a user to make donations to local charities. Further donation incentivization is realized by analyzing a purchase history of the user to provide previous purchases that the user may want to donate. A redemption code system provides redemption codes to charity provider for distribution to donating users, and allows the charity providers to provide details about the donation in order to allow an amount of virtual currency to be determined for crediting to a user game account of the user.

Figure 8:
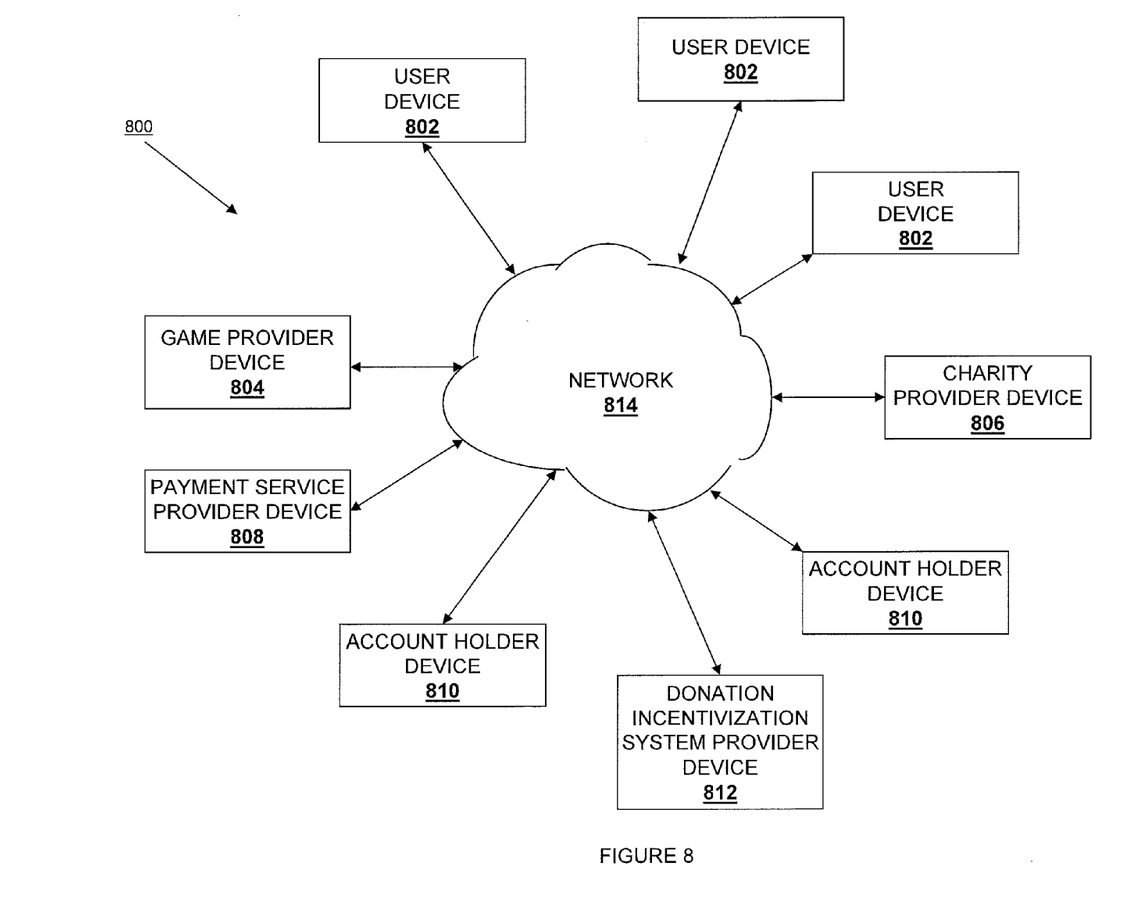
FIG. 8 is a schematic view illustrating an embodiment of a networked system.

Referring now to FIG. 8, an embodiment of a networked system 800 used in the payment system described above is illustrated. The networked system 800 includes a plurality of user devices 802, a game provider device 804, a charity provider device 806, a payment service provider device 808, a plurality of account holder devices 810, and/or a donation incentivization system provider device 812 in communication over a network 814.

Any of the user devices 802 may be the user devices, discussed above. The game provider device 804 may be the game provider devices discussed above and may be operated by the game providers discussed above. The charity provider device 806 may be the charity provider devices discussed above and may be operated by a charity provider. The payment service provider device 808 may be the payment service provider devices discussed above and may be operated by a payment service provider such as, for example, PayPal Inc. of San Jose, Calif. The account provider device 810 may be the account provider devices discussed above and may be operated by the account providers discussed above such as, for example, credit card account providers, bank account providers, savings account providers, and a variety of other account providers known in the art. The donation incentivization system provider device 812 may be the donation incentivization system provider devices discussed above and may be operated by a donation incentivization system providers, discussed above.

The user devices 802, a game provider device 804, a charity provider device 806, a payment service provider device 808, a plurality of account holder devices 810, and/or a donation incentivization system provider device 812 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 814.

The network 814 may be implemented as a single network or a combination of multiple networks. For example, in various embodiments, the network 814 may include the Internet and/or one or more intranets, landline networks, wireless networks, and/or other appropriate types of networks.

The user device 802 may be implemented using any appropriate combination of hardware and/or software configured for wired and/or wireless communication over network 814. For example, in one embodiment, the user device 802 may be implemented as a personal computer of a user in communication with the Internet. In other embodiments, the user device 802 may be a smart phone, personal digital assistant (PDA), laptop computer, and/or other types of computing devices.

The user device 802 may include one or more browser applications which may be used, for example, to provide a convenient interface to permit the payer to browse information available over the network 814. For example, in one embodiment, the browser application may be implemented as a web browser configured to view information available over the Internet.

The user device 802 may also include one or more toolbar applications which may be used, for example, to provide user-side processing for performing desired tasks in response to operations selected by the payer. In one embodiment, the toolbar application may display a user interface in connection with the browser application.

The user device 802 may further include other applications as may be desired in particular embodiments to provide desired features to the user device 802. In particular, the other applications may include a payment application for payments assisted by a payment service provider through the payment service provider device 808. The other applications may also include security applications for implementing user-side security features, programmatic user applications for interfacing with appropriate application programming interfaces (APIs) over the network 814, or other types of applications. Email and/or text applications may also be included, which allow the payer to send and receive emails and/or text messages through the network 814. The user device 802 includes one or more user and/or device identifiers which may be implemented, for example, as operating system registry entries, cookies associated with the browser application, identifiers associated with hardware of the user device 802, or other appropriate identifiers, such as a phone number. In one embodiment, the user identifier may be used by the game provider device 804, the charity provider device 806, the payment service provider device 808, the account provider device 810, and/or the donation incentivization system provider device 812 to associate the user with a particular account as further described herein.

Figure 9:
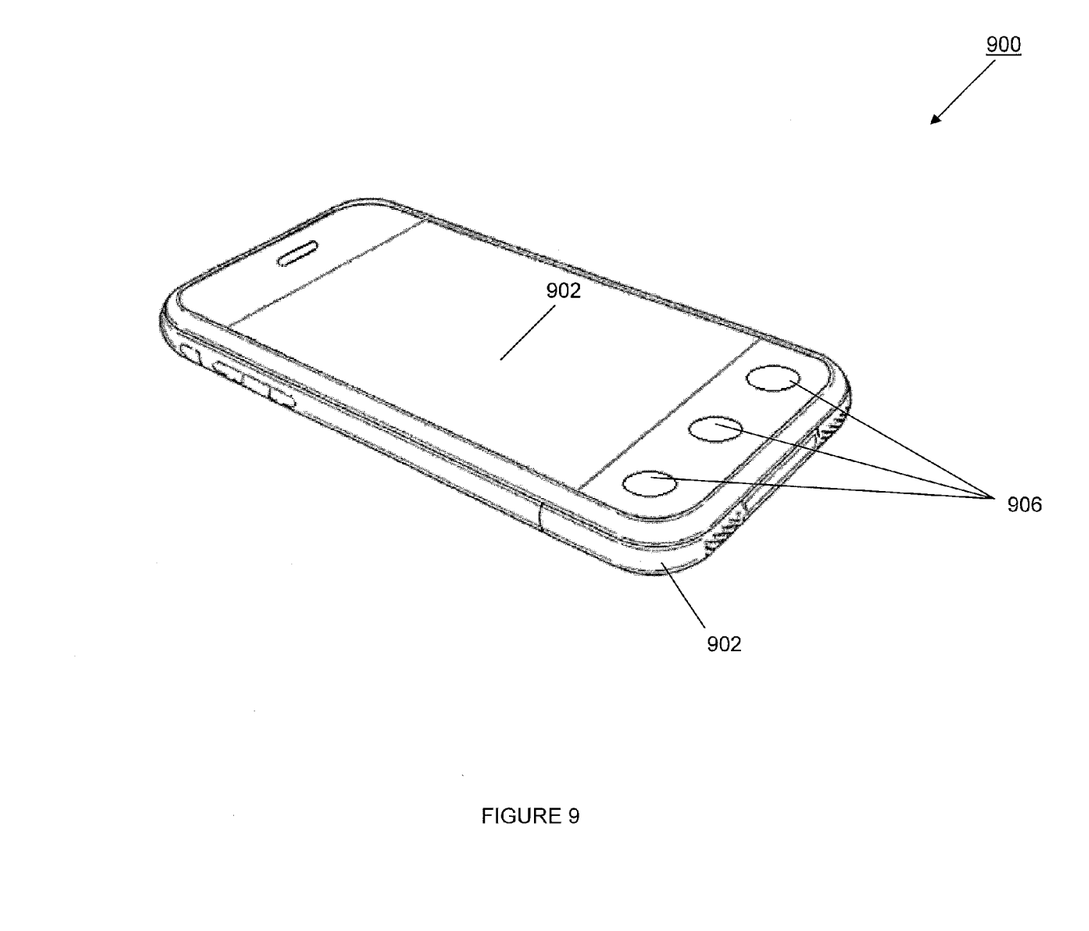
FIG. 9 is a perspective view illustrating an embodiment of a user device.

Referring now to FIG. 9, an embodiment of a user device 900 is illustrated. The user device 900 may be the user devices discussed above. The user device 900 includes a chassis 902 having a display 904 and an input device including the display 904 and a plurality of input buttons 906. One of skill in the art will recognize that the payer device 900 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 10:
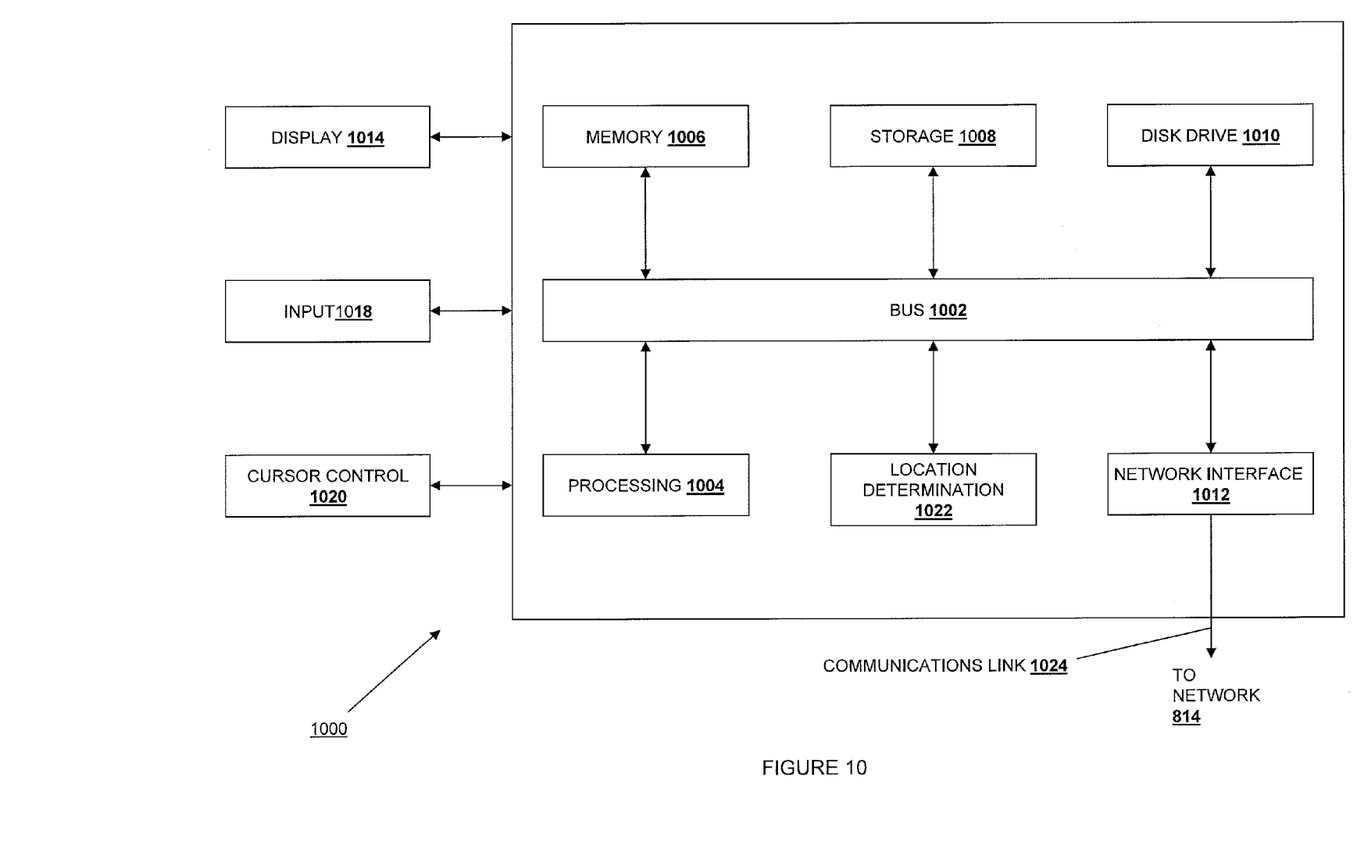
FIG. 10 is a schematic view illustrating an embodiment of a computer system.

Referring now to FIG. 10, an embodiment of a computer system 1000 suitable for implementing, for example, user devices 802, game provider devices 804, charity provider devices 806, payment service provider devices 808, account holder devices 810, and/or donation incentivization system provider devices 812, is illustrated. It should be appreciated that other devices utilized by payer, payees, payment service providers, and account providers in the payment system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and/or a location determination component 1022 (e.g., a Global Positioning System (GPS) device as illustrated, a cell tower triangulation device, and/or a variety of other location determination devices known in the art.) In one implementation, the disk drive component 1010 may comprise a database having one or more disk drive components.

In accordance with embodiments of the present disclosure, the computer system 800 performs specific operations by the processor 1004 executing one or more sequences of instructions contained in the memory component 1006, such as described herein with respect to the user devices 802, game provider devices 804, charity provider devices 806, payment service provider devices 808, account holder devices 810, and/or donation incentivization system provider devices 812. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 814 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
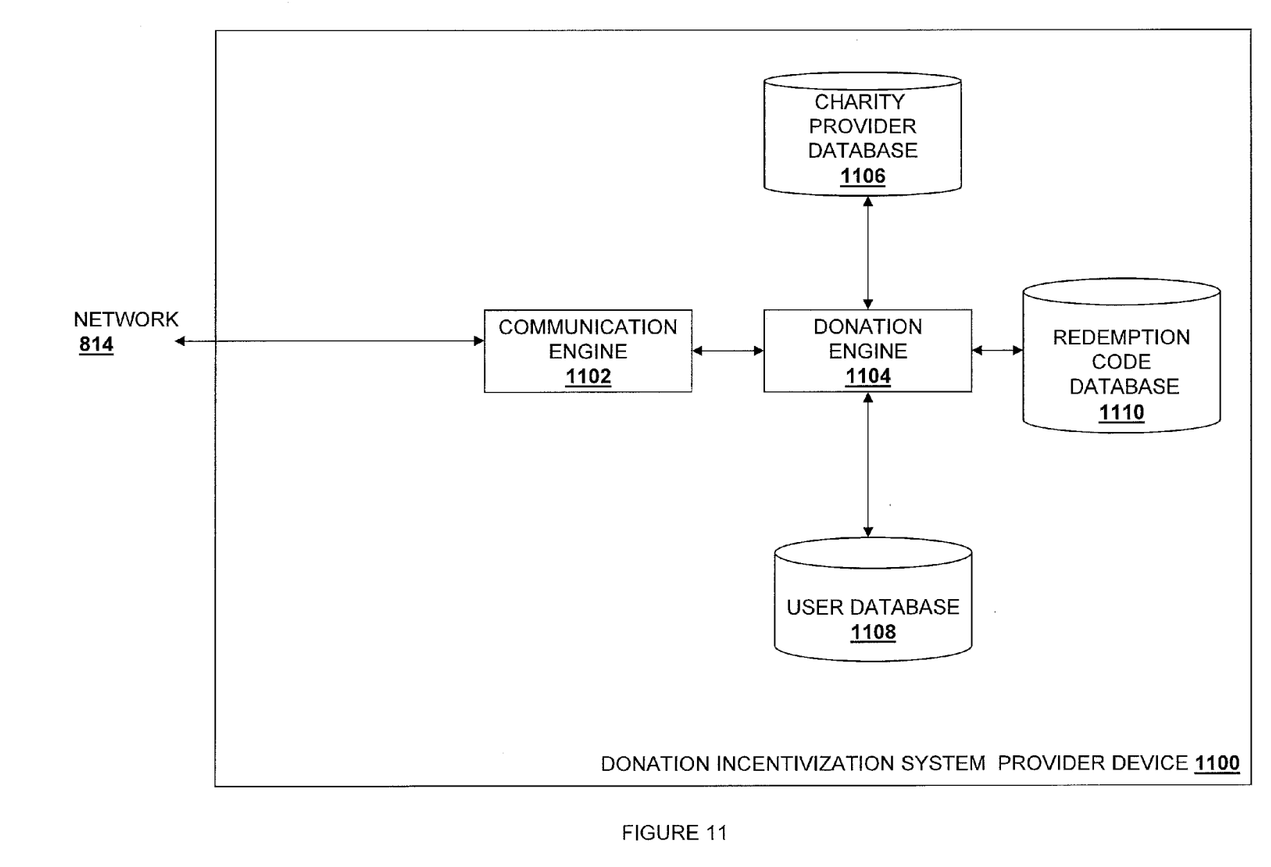
FIG. 11 is a schematic view illustrating an embodiment of a donation incentivization provider device.

Referring now to FIG. 11, an embodiment of a donation incentivization system provider device 1100 is illustrated. In an embodiment, the device 900 may be the game provider devices 804, charity provider devices 806, payment service provider devices 808, account holder devices 810, and/or donation incentivization system provider devices 812 described above. The device 1100 includes a communication engine 902 that is coupled to the network 814 and to donation engine 1104 that is coupled to a charity provider database 1106, a user database 1108, and a redemption code database 1110. The communication engine 1102 may be software or instructions stored on a computer-readable medium that allows the device 1100 to send and receive information over the network 814. The donation engine 1104 may be software or instructions stored on a computer-readable medium that is operable to determine whether user are associated with games (e.g., by searching user accounts in the user database 1108), determine whether charities are associated with games and within a predetermined distance of a location of a user (e.g., using charity provider information in the charity provider database 1106), send redemption codes (e.g., retrieved from the redemption code database 1110) to charity provider devices, receive redemption codes and/or redemption codes associated with donation details from charity provider devices and store them (e.g., in the redemption code database 1110, receive redemption codes from user devices, retrieve donation details (e.g., from the redemption code database 1110) using redemption codes, determine virtual currency amounts to credit to user game accounts using donation details, and provide any of the other functionality that is discussed above. While the databases 1106, 1108, and 1110 have been illustrated as located in the device 1100, one of skill in the art will recognize that they may be connected to the donation engine 1104 through the network 814 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for incentivizing donations using virtual currencies, comprising:
   determining, by a system provider device, that a user is associated with a game in at least one database;
   determining, by the system provider device, a location of the user;
   determining, by the system provider device, that a plurality of charity providers are associated with the game in the at least one database and that each of the plurality of charity providers are located within a predetermined distance of the location of the user;
   reviewing, by the system provider device, a purchase history of the user in the at least one database;
   determining, by the system provider device, that a plurality of purchases in the purchase history each include a purchase date that exceeds a predetermined age;
   sending, by the system provider device, a donation incentivization message to a user device of the user over a network, wherein the donation incentivization message includes identifiers for each of the plurality of purchases that include the purchase date that exceeds the predetermined age and a map that is displayable on the user device with an identification of each of the plurality of charity providers on the map;
   sending, by the system provider device, a plurality of redemption codes to a first charity provider device of at least one of the plurality of the charity providers over the network; and
   receiving, by the system provider device, a first redemption code of the plurality of redemption codes over the network from at least one of the user device or the first charity provider device, wherein the first redemption code is associated with the user and a donation from the user to the charity provider of at least one of the plurality of purchases, and wherein in response to receiving the first redemption code, a user account that is associated with the user in the at least one database is credited, by the system provider device, with a virtual currency amount that is determined using the donation of the at least one of the plurality of purchases.

2. The method of claim 1, further comprising:
   determining, by the system provider device, an estimated value of each of the plurality of purchases having the purchase date that exceeds the predetermined age, wherein the donation incentivization message includes the estimated value.

3. The method of claim 1, further comprising:
receiving, by the system provider device from the user device over the network, a selection of a first game of a plurality of games that are associated with the user account and to which the virtual currency amount should be applied; and
   crediting the first game with the virtual currency amount.

4. The method of claim 1, wherein the virtual currency amount corresponds to a virtual currency that is redeemable in the game.

5. The method of claim 1, wherein the first redemption code includes a plurality of details associated with the donation, and the method further comprises:
   using, by the system provider device, the plurality of details associated with the donation to determine the virtual currency amount.

6. The method of claim 1, further comprising:
   requesting, by the system provider device, a coupon from a merchant that is associated with a first purchase of the plurality of purchases;
   offering, by the system provider device, the coupon to the user in exchange for donating the first purchase; and
   providing, by the system provider device, the coupon to the user device over the network in response to receiving the first redemption code that is associated with the user and the donation from the user to the charity provider of the first purchase.

7. A non-transitory machine readable medium comprising a plurality of machine-readable instruction which, when executed by one or more processors, are adapted to cause the one or more processors to perform a method comprising:
   determining that a user is associated with a game;
   determining a location of the user;
   determining that a plurality of charity providers are associated with the game and that each of the plurality of charity providers are located within a predetermined distance of the location of the user;
   retrieving a plurality of purchases from the purchase history of the user;
   requesting a coupon from a merchant that is associated with a first purchase of the plurality of purchases;
   sending a donation incentivization message to a user device of the user over a network, wherein the donation incentivization message includes identifiers for each of the plurality of purchases, an offer of the coupon to the user in exchange for donating the first purchase, and a map that is displayable on the user device with an identification of each of the plurality of charity providers on the map;
   sending a plurality of redemption codes to a first charity provider device of at least one of the plurality of charity providers; and
   receiving a first redemption code of the plurality of redemption codes from at least one of the user device or the first charity provider device, wherein the first redemption code is associated with the user and a donation from the user to the charity provider of the first purchase, and wherein in response to receiving the first redemption code, a user account that is associated with the user is credited with a virtual currency amount that is determined using the donation of the first purchase, and the coupon is provided to the user.

8. The non-transitory machine-readable medium of claim 7, wherein the method further comprises:
   reviewing the purchase history of the user;
   determining that the plurality of purchases each include a purchase date that exceeds a predetermined age, wherein the donation incentivization message includes the plurality of purchases having the purchase date that exceeds the predetermined age.

9. The non-transitory machine-readable medium of claim 8, wherein the method further comprises:
   determining an estimated value of each of the at least one of the plurality of purchases having the purchase date that exceeds the predetermined age, wherein the donation incentivization message includes the estimated value.

10. The non-transitory machine-readable medium of claim 7, wherein the method further comprises:
   receiving, from the user device, a selection of a first game of a plurality of games that are associated with the user account and to which the virtual currency amount should be applied; and
   crediting the first game with the virtual currency amount.

11. The non-transitory machine-readable medium of claim 7, wherein the virtual currency amount corresponds to a virtual currency that is redeemable in the game.

12. The non-transitory machine-readable medium of claim 7, wherein the method further comprises:
using a plurality of details associated with the donation to determine the virtual currency amount.

13. A virtual currency donation incentivization system, comprising:
a storage device storing user information, redemption code information, and charity provider information; and
one or more processors in communication with the storage device for:
determining that a user associated with a game using the user information;
determining a location of the user;
determining that a plurality of charity providers are associated with the game using the charity provider information, and determining that the plurality of charity providers are located within a predetermined distance of the location of the user;
reviewing a purchase history of the user;
determining that a plurality of purchases in the purchase history each include a purchase date that exceeds a predetermined age;
sending a donation incentivization message to a user, wherein the donation incentivization message includes details about the plurality of purchases that include the purchase date that exceeds the predetermined age and a map that is displayable on the user device with an identification of each of the plurality of charity providers on the map;
sending a plurality of redemption codes to a first charity provider of the plurality of charity providers using the redemption code information;
receiving a first redemption code of the plurality of redemption codes from at least one of the user device or the first charity provider, wherein the first redemption code is associated with the user and a donation from the user to the charity provider of at least one of the plurality of purchases, and wherein in response to receiving the first redemption code, the user is credited with a virtual currency amount that is determined using the donation of the at least one of the plurality of purchases.

14. The system of claim 13, wherein the one or more processors are in communication with the memory for:
determining an estimated value of each of the plurality of purchases having the purchase date that exceeds the predetermined age, wherein the donation incentivization message includes the estimated value.

15. The system of claim 13, wherein the one or more processors are in communication with the memory for:
receiving, from the user device, a selection of a first game of a plurality of games that are associated with the user account and to which the virtual currency amount should be applied; and
crediting the first game with the virtual currency amount.

16. The system of claim 13, wherein the one or more processors are in communication with the memory for:
using a plurality of details associated with the donation to determine the virtual currency amount.

17. The system of claim 13, the one or more processors are in communication with the memory for:
requesting a coupon from a merchant that is associated with a first purchase of the plurality of purchases;
offering the coupon to the user in exchange for donating the first purchase; and
providing the coupon to the user device in response to receiving the first redemption code that is associated with the user and the donation from the user to the charily provider of the first purchase.

18. A virtual currency donation incentivization system, comprising:
a storage device storing user information, redemption code information, and charity provider information; and
one or more processors in communication with the storage device for:
determining that a user associated with a game using the user information;
determining a location of the user;
determining that a plurality of charity providers are associated with the game using the charity provider information, and determining that the plurality of charity providers are located within a predetermined distance of the location of the user;
retrieving a plurality of purchases from a purchase history of the user;
requesting a coupon from a merchant that is associated with a first purchase of the plurality of purchases;
sending a donation incentivization message to a user, wherein the donation incentivization message includes details about the plurality of purchases, an offer of the coupon to the user in exchange for donating the first purchase, and a map that is displayable on the user device with an identification of each of the plurality of charity providers on the map;
sending a plurality of redemption codes to a first charity provider of the plurality of charity providers using the redemption code information;
receiving a first redemption code of the plurality of redemption codes from at least one of the user device or the first charity provider, wherein the first redemption code is associated with the user and a donation from the user to the charity provider of the first purchase, and wherein in response to receiving the first redemption code, the user is credited with a virtual currency amount that is determined using the donation of the first purchase, and the coupon is provided to the user device.

* * * * *